(12) United States Patent
Shigemori

(10) Patent No.: US 11,979,404 B2
(45) Date of Patent: May 7, 2024

(54) INFORMATION PROVIDING METHOD, INFORMATION PROVIDING SYSTEM, AND SERVER

(71) Applicant: OMRON CORPORATION, Kyoto (JP)

(72) Inventor: Yutsuka Shigemori, Kusatsu (JP)

(73) Assignee: OMRON CORPORATION, Kyoto (JP)

(*) Notice: Subject to any disclaimer, the term of this patent is extended or adjusted under 35 U.S.C. 154(b) by 316 days.

(21) Appl. No.: 17/595,801

(22) PCT Filed: Mar. 9, 2020

(86) PCT No.: PCT/JP2020/009962
§ 371 (c)(1),
(2) Date: Nov. 24, 2021

(87) PCT Pub. No.: WO2020/246093
PCT Pub. Date: Dec. 10, 2020

(65) Prior Publication Data
US 2022/0224689 A1    Jul. 14, 2022

(30) Foreign Application Priority Data
Jun. 3, 2019    (JP) ................. 2019-103861

(51) Int. Cl.
*H04L 9/40*        (2022.01)
*H04W 4/80*       (2018.01)

(52) U.S. Cl.
CPC .............. *H04L 63/10* (2013.01); *H04W 4/80* (2018.02)

(58) Field of Classification Search
None
See application file for complete search history.

(56) References Cited

U.S. PATENT DOCUMENTS 11,244,561 B1 * 2/2022 Fuchs .................. H04W 12/68
2010/0100935 A1   4/2010 Sato et al.
(Continued)

FOREIGN PATENT DOCUMENTS

| CN | 102667799 A | 9/2012 |
| CN | 103503408 A | 1/2014 |

(Continued)

OTHER PUBLICATIONS

Extended European Search Report dated May 16, 2023 in Application No. 20818935.7.

(Continued)

*Primary Examiner* — Cai Y Chen
(74) *Attorney, Agent, or Firm* — Sughrue Mion, PLLC

(57) ABSTRACT

An information providing method includes (i) starting, by a control device, a communication session with a server in response to establishment of a communication connection with a terminal, and (ii) issuing, by the server, temporary access information for accessing a service in a manner that depends on the communication session. The access information is different for each communication session. The information providing method further includes (iii) notifying, by the control device, the access information to the terminal, and (iv) providing, by the server, target information collected from the control device to the terminal in response to access from the terminal based on the access information. Accordingly, the threat to security when providing information of the control device is reduced.

9 Claims, 13 Drawing Sheets

(56) References Cited

U.S. PATENT DOCUMENTS

| | | |
|---|---|---|
| 2012/0284786 A1 | 11/2012 | Somani et al. |
| 2013/0262696 A1 | 10/2013 | Watanabe |
| 2015/0067828 A1 | 3/2015 | Alvarez et al. |
| 2015/0215321 A1 | 7/2015 | Fries et al. |
| 2016/0352752 A1 | 12/2016 | Bush et al. |

FOREIGN PATENT DOCUMENTS

| | | |
|---|---|---|
| EP | 1 971 103 A1 | 9/2008 |
| JP | 2001-292176 A | 10/2001 |
| JP | 2004-213406 A | 7/2004 |
| JP | 2010-176238 A | 8/2010 |
| JP | 2013-210896 A | 10/2013 |
| WO | 2008/090708 A1 | 7/2008 |
| WO | 2011/037226 A1 | 3/2011 |

OTHER PUBLICATIONS

Written Opinion for PCT/JP2020/009962, dated Jun. 9, 2020.
International Search Report for PCT/JP2020/009962, dated Jun. 9, 2020.
Communication dated Feb. 29, 2024 issued by the Chinese Patent Office in Application No. 202080039532.X.

* cited by examiner

INFORMATION PROVIDING METHOD, INFORMATION PROVIDING SYSTEM, AND SERVER

CROSS REFERENCE TO RELATED APPLICATIONS

This application is a National Stage of International Application No. PCT/JP2020/009962 filed Mar. 9, 2020, claiming priority based on Japanese Patent Application No. 2019-103861 filed Jun. 3, 2019, the entire contents of each of which being herein incorporated by reference in their entireties.

TECHNICAL FIELD

The present disclosure relates to an information providing method, an information providing system, and a server.

BACKGROUND ART

Japanese Patent Laying-Open No. 2004-213406 (PTL 1) discloses a remote management system including a factory automation (FA) device for controlling machinery in a plant or factory and a network device. The network device is connected to the FA device over a network to monitor the FA device.

CITATION LIST

Patent Literature

PTL 1: Japanese Patent Laying-Open No. 2004-213406

SUMMARY OF INVENTION

Technical Problem

According to the technology described in PTL 1, a control device such as the FA device can be monitored using the network device. However, when information (for example, a URL) for accessing the control device has leaked out to an unintended third party, unauthorized access may be made to the control device from a network device different from an authorized network device. Such unauthorized access causes information of the control device to leak out to the third party.

The present disclosure has been made in view of the above-described problems, and it is therefore an object of the present disclosure to provide an information providing method, an information providing system, and a server that can reduce the threat to security of provision of information of a control device.

Solution to Problem

According to an example of the present disclosure, there is provided an information providing method applied to an information providing system including a control device configured to control a control target, a server configured to provide a service associated with the control device, and a terminal, the information providing method including (i) starting, by the control device, a communication session with the server in response to establishment of a communication connection with the terminal, and (ii) issuing, by the server, temporary access information for accessing a service in a manner that depends on the communication session. The access information is different for each communication session. The information providing method further includes (iii) notifying, by the control device, the access information to the terminal, and (iv) providing, by the server, target information collected from the control device to the terminal in response to access from the terminal based on the access information.

According to this disclosure, the temporary access information is issued upon the establishment of the communication connection between the terminal and the control device. The terminal can obtain the target information from the server by accessing the server based on the access information received from the control device. The access information is not notified to a terminal that has no communication connection with the control device. This makes an unintended third party unable to recognize the access information and make unauthorized access to the server using another terminal. This can reduce the threat to security.

In the above-described disclosure, the access information is a one-time URL. According to this disclosure, the terminal can access, using a general-purpose Web browser, a service according to the one-time URL.

In the above-described disclosure, the terminal and the control device are communicatively connected using near-field communication. The control device is typically installed in a factory. Generally speaking, any third party other than parties concerned (including an observer) is not allowed to enter the factory. The access information for accessing a service is issued upon the establishment of the communication connection between the terminal and the control device. This can prevent the access information from being issued to a third party who is not allowed to enter a facility where the control device is installed. This can further reduce the threat to security.

In the above-described disclosure, the information providing method further includes generating, by one of the control device and the server, an identification code for identifying the communication session and outputting the identification code to the other of the control device and the server. The notifying includes notifying, by the control device, the identification code to the terminal together with the access information. The information providing method further includes determining, by the server, whether a code received from the terminal that has made access based on the access information coincides with the identification code. The providing is performed in response to a determination result that the code received from the terminal and the identification code coincide with each other.

According to this disclosure, even when a third party who has obtained the access information in an unauthorized manner inputs the access information to another terminal, the third party is unable to receive a service because the third party does not recognize the identification code. This can further reduce the threat to security.

In the above-described disclosure, the information providing method further includes invalidating, by the server, the access information upon lapse of a predetermined period of time from the issuance of the access information.

According to this disclosure, even when the access information has leaked out to a third party, the third party is unable to receive a service using the access information after the lapse of the predetermined period of time. This can further reduce the threat to security.

In the above-described disclosure, the information providing method further includes invalidating, by the server, the access information after the providing.

According to this disclosure, even when the access information has leaked out to a third party, the third party is unable to receive a service using the access information after the termination of the provision of the service to an authorized observer. This can further reduce the threat to security.

In the above-described disclosure, the information providing method further includes performing, by the control device, authentication of the terminal. The starting a communication session is performed in response to success of the authentication.

According to this disclosure, it is possible to prevent the access information from leaking out to a third party other than the authorized observer.

According to an example of the present disclosure, an information providing system includes a control device configured to control a control target, a server configured to provide a service associated with the control device, and a terminal. The control device includes a communication processor configured to start a communication session with the server in response to establishment of a communication connection with the terminal. The server includes an issuing unit configured to issue temporary access information for accessing the service in a manner that depends on the communication session, and an output unit configured to output the access information to the control device. The access information is different for each communication session. The control device further includes a notification unit configured to notify the access information to the terminal. The server further includes a service module configured to provide target information collected from the control device to the terminal in response to access from the terminal based on the access information.

According to an example of the present disclosure, a server provided in the information providing system includes the issuing unit, the output unit, and the service module.

According to the disclosure described above, it is possible to reduce the threat to security of providing information of a control device.

Advantageous Effects of Invention

According to the present disclosure, it is possible to reduce the threat to security of provision of information of a control device.

DESCRIPTION OF EMBODIMENTS

Figure 1:
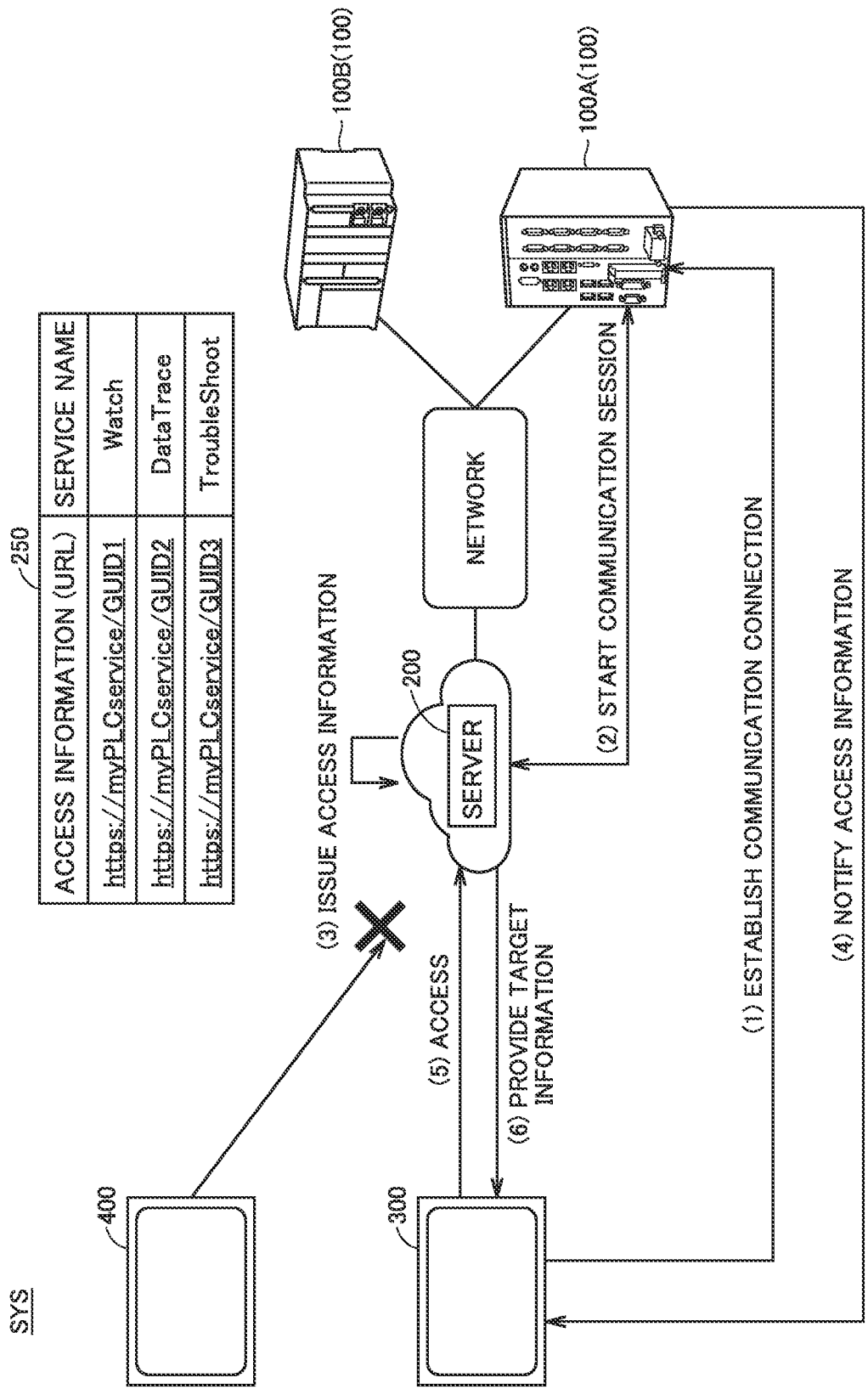
FIG. 1 is a diagram schematically illustrating an overall configuration of an information providing system according to an embodiment.

Embodiment according to the present invention will be described in detail with reference to the drawings. Note that the same or corresponding parts in the drawings are denoted by the same reference numerals, and no redundant description will be given of such parts.

§ 1 Application example

First, an example of a case to which the present invention is applied will be described with reference to FIG. 1. FIG. 1 is a diagram schematically illustrating an overall configuration of an information providing system according to the embodiment. An information providing system SYS illustrated in FIG. 1 includes at least one control device 100 that controls a control target, a server 200, and a terminal 300.

In the example illustrated in FIG. 1, at least one control device 100 includes control devices 100A, 100B. Control devices 100A, 100B are FA devices making up a network system for factory automation and are, for example, programmable logic controllers (PLCs).

Control device 100 controls a control target (such as a motor, a robot, a camera, or various sensors) installed in a production line. Control device 100 executes a control program designed in advance to control a connected control target (not illustrated). Control device 100 executes the control program to obtain target information to be provided to an observer. The type of the target information is not limited to a specific type. Examples of the target information include a variable indicating a position of a motor to be controlled, a feature detected from an image captured by a camera to be controlled, and the like.

Terminal 300 is used by an observer who checks at least one control device 100 to display the target information for the observer. Terminal 300 is, for example, a mobile device such as a smartphone, a tablet, or a laptop computer. The observer uses terminal 300 to check the target information collected from desired control device 100.

Server 200 provides a service associated with each control device 100. The service provides terminal 300 with the target information collected from corresponding control device 100. Server 200 is a computer responsible for returning, in response to a request or command from another computer (terminal 300 in the example illustrated in FIG. 1) on the network, information or a processing result. Note that server 200 may be a cloud server built on the cloud and provides information processing services over the Internet. The cloud server is typically a virtual server built on the cloud.

Figure 2:
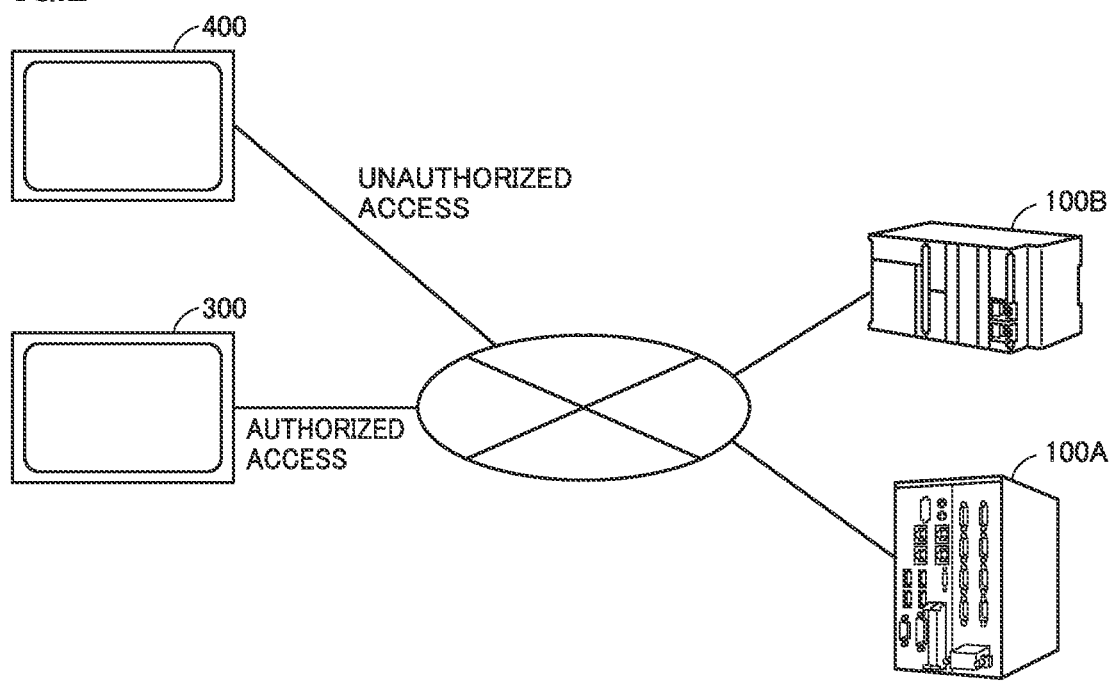
FIG. 2 is a diagram illustrating a configuration of an information providing system according to a reference embodiment.

FIG. 2 is a diagram illustrating a configuration of an information providing system according to a reference embodiment. In the example illustrated in FIG. 2, an authorized observer uses terminal 300 to access control devices 100A, 100B over a network such as a virtual private network (VPN) and obtains the target information from control devices 100A, 100B. Access information (for example, a uniform resource locator (URL)) for obtaining the target information from control devices 100A, 100B is static information, so that there is a possibility that the access information will leak out to an unintended third party. In this case, the third party may make unauthorized access to control devices 100A, 100B using a terminal 400 owned by the third party. This brings about the threat to leakage of target information of control devices 100A, 100B to an unintended third party.

Further, a protocol and command used to receive the target information from the control device may differ by type of the control device. It is therefore required that terminal 300 use different protocols and commands by type of the control device.

In view of such a problem, in information providing system SYS according to the present embodiment, an information providing method including the following steps (1) to (6) is performed as illustrated in FIG. 1.

(1) The observer establishes a communication connection between terminal 300 and desired control device 100 (control device 100A in the example illustrated in FIG. 1).

(2) Control device 100 starts a communication session with server 200 in response to the establishment of the communication connection with terminal 300.

(3) Server 200 issues, in a manner that depends on the communication session, temporary access information 250 for accessing a service associated with control device 100 having the communication session.

Access information 250 shows an application programming interface (API) such as a one-time URL. When a plurality of services associated with control device 100 are available, server 200 issues access information 250 for each of the plurality of services. Server 200 issues different access information 250 by communication session.

(4) Control device 100 notifies access information 250 issued by server 200 to terminal 300.

(5) The observer operates terminal 300 to specify access information 250 associated with a desired service. Terminal 300 accesses server 200 based on access information 250 thus specified.

(6) Server 200 executes a service associated with access information 250 in response to the access from terminal 300 based on access information 250.

Specifically, server 200 collects the target information from control device 100 (control device 100A in the example illustrated in FIG. 1) associated with the service and provides the target information thus collected to terminal 300.

According to such an information providing method, temporary access information 250 is issued upon the establishment of the communication connection between terminal 300 and control device 100. Terminal 300 can obtain the target information from server 200 by accessing server 200 based on access information 250 received from control device 100.

Terminal 400 having no communication connection with control device 100 is not notified of access information 250. This makes an unintended third party unable to recognize access information 250 and make unauthorized access to server 200 using terminal 400. This can reduce the threat to security.

Further, access information 250 is temporarily issued. Therefore, even when access information 250 is successfully obtained from terminal 300 in an unauthorized manner, there is a possibility that access information 250 is already invalid. This can further reduce the threat to security.

Furthermore, the target information of control devices 100A, 100B is provided by server 200. This allows terminal 300 to obtain the target information of both control devices 100A, 100B using the protocol and the command applied to the communication between terminal 300 and server 200. That is, terminal 300 need not use different protocols and commands by type of the control device.

§ 2 Specific Example

Next, a specific example of the information providing system according to the present embodiment will be described.

<A. Example of Hardware Configuration of Control Device>

Figure 3:
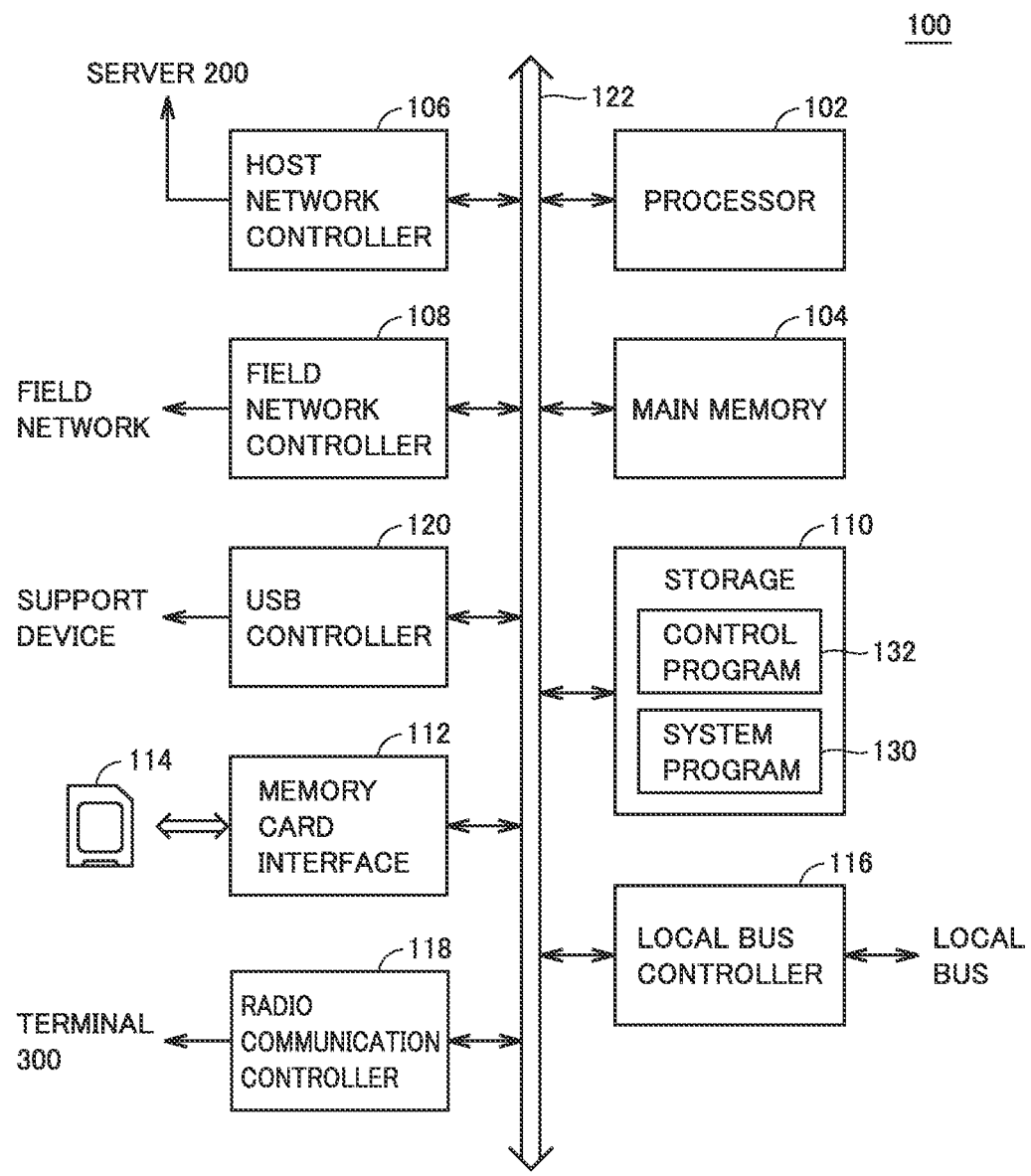
FIG. 3 is a diagram schematically illustrating an example of a hardware configuration of a control device that is a part of the information providing system according to the embodiment.

FIG. 3 is a diagram schematically illustrating an example of a hardware configuration of the control device that is a part of the information providing system according to the present embodiment. As illustrated in FIG. 3, control device 100 includes a processor 102, a main memory 104, a storage 110, a host network controller 106, a field network controller 108, a universal serial bus (USB) controller 120, a memory card interface 112, a local bus controller 116, and a radio communication controller 118. Such components are connected over a processor bus 122.

Processor 102 primarily serves as an operation processor that performs a control operation related to the control of the control target, and includes a central processing unit (CPU), a graphics processing unit (GPU), or the like. Specifically, processor 102 reads a program (for example, a system program 130 and a control program 132) stored in storage 110, loads the program into main memory 104, and executes the program, thereby enabling the control operation and various processing to be performed in a manner that depends on the control target.

Main memory 104 includes a volatile storage device such as a dynamic random access memory (DRAM) or a static random access memory (SRAM). Storage 110 includes, for example, a non-volatile storage device such as a hard disk drive (HDD) or a solid state drive (SSD).

Storage 110 stores control program 132 created to adapt to the control target, in addition to system program 130 for implementing a basic function. Control program 132 is stored in storage 110 by a support device connected via USB controller 120. Storage 110 further stores various types of information.

Host network controller 106 exchanges data with an information processor such as server 200 over a host network.

Field network controller 108 exchanges data with any desired device such as the control target over a field network.

USB controller 120 controls the exchange of data with the support device over a USB connection.

Memory card interface 112 receives memory card 114 that is an example of a removable recording medium. Memory card interface 112 can write data to memory card 114 and read various data (such as logs and trace data) from memory card 114.

Local bus controller 116 exchanges data with any desired unit connected to control device 100 over a local bus.

Radio communication controller 118 exchanges data with nearby terminal 300 using near-field communication. Radio communication controller 118 uses a known communication system such as Bluetooth (registered trademark) or Bluetooth (registered trademark) Low Energy (BLE) as the near-field communication.

FIG. 3 illustrates the configuration example where processor 102 executes a program to provide necessary functions, but some or all of the functions thus provided may be implemented by a dedicated hardware circuit (for example, an application specific integrated circuit (ASIC), a field-programmable gate array (FPGA), or the like). Alternatively, a core part of control device 100 may be implemented by hardware having a general-purpose architecture (for example, an industrial personal computer based on a general-purpose personal computer). In such a case, a plurality of operating systems (OSs) having different uses may be executed in parallel using a virtualization technology, and a necessary application may be executed on each OS.

<B. Example of Hardware Configuration of Server>

Figure 4:
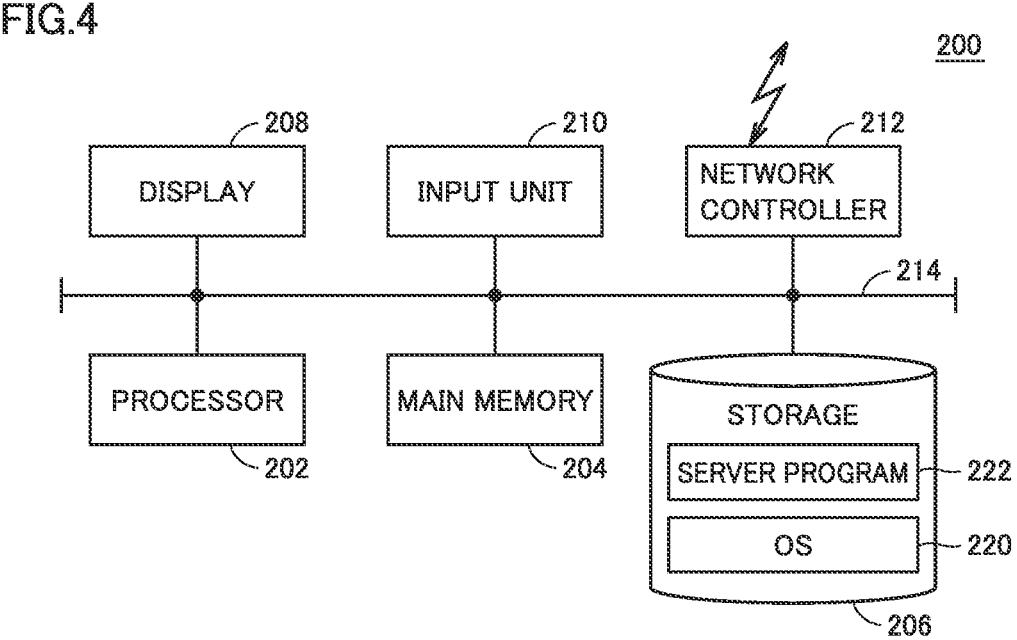
FIG. 4 is a diagram schematically illustrating an example of a hardware configuration of a server that is a part of the information providing system according to the embodiment.

FIG. 4 is a diagram schematically illustrating an example of a hardware configuration of the server that is a part of the information providing system according to the present embodiment. Server 200 in the example illustrated in FIG. 4 includes a processor 202 such as a CPU or an MPU, a main memory 204, a storage 206, a display 208, an input unit 210 such as a keyboard or a mouse, and a network controller 212 for exchanging data with other devices. Such components are connected over an internal bus 214 so as to communicate data with each other.

Main memory 204 includes a volatile storage device such as a DRAM or an SRAM. Storage 206 includes, for example, a non-volatile storage device such as an SSD or an HDD.

Storage 206 stores an OS 220 for providing server 200 with a runtime environment of a basic program, and a server program 222 for defining the operation of server 200. Such programs are load into main memory 204 and executed by processor 202. Storage 206 further stores various types of information on services that can be provided.

<C. Example of Hardware Configuration of Terminal>

Figure 5:
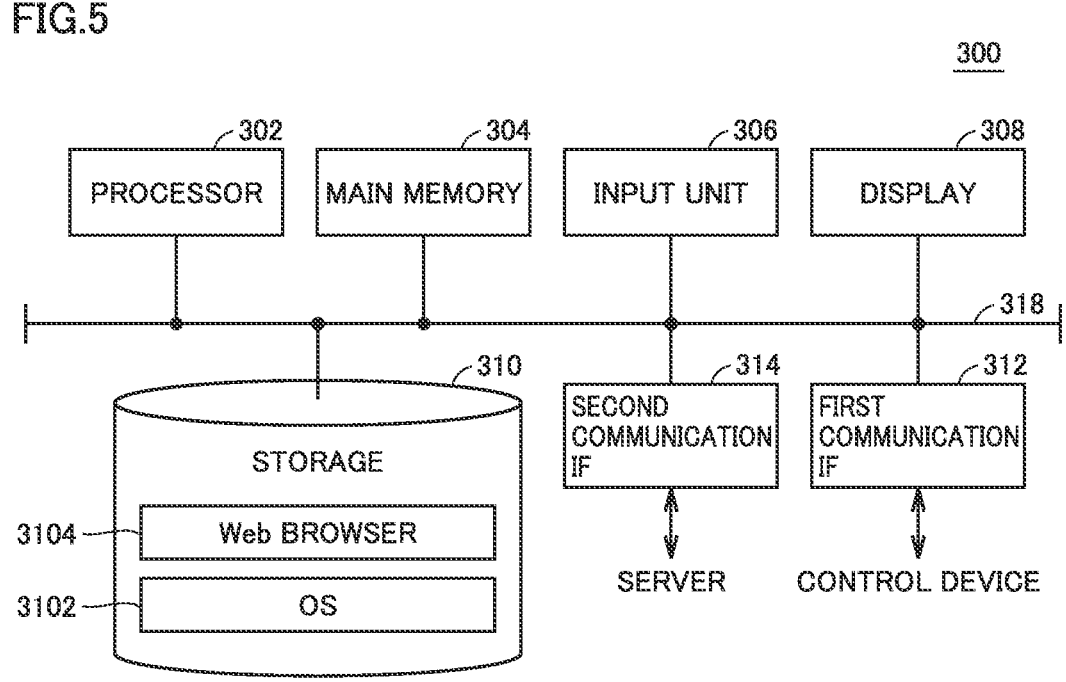
FIG. 5 is a diagram schematically illustrating an example of a hardware configuration of a terminal that is a part of the information providing system according to the embodiment.

FIG. 5 is a diagram schematically illustrating an example of a hardware configuration of the terminal that is a part of the information providing system according to the present embodiment. Terminal 300 is implemented by, for example, hardware having a general-purpose architecture (such as a smartphone, a tablet, or a laptop computer).

As shown in FIG. 5, terminal 300 includes a processor 302, a main memory 304, an input unit 306, a display 308, a storage 310, a first communication interface 312, and a second communication interface 314. Such components are connected over a processor bus 318.

Main memory 304 includes a volatile storage device such as a DRAM or an SRAM. Storage 310 includes, for example, a non-volatile storage device such as an SSD or an HDD.

Processor 302 includes a CPU, an MPU, or the like, and reads a program (for example, an OS 3102 and a Web browser 3104) stored in storage 310, loads the program into main memory 204, and executes the program, thereby enabling various processing to be performed.

Main memory 304 includes a volatile storage device such as a DRAM or an SRAM. Storage 310 includes, for example, a non-volatile storage device such as an HDD or an SSD.

Storage 310 stores Web browser 3104 in addition to OS 3102 for implementing a basic function. Storage 310 further stores various types of information received from control device 100 or server 200.

Input unit 306 includes a touchscreen, a keyboard, a mouse, or the like, and receives a user operation. Display 308 displays a result of processing performed by processor 302 or the like.

First communication interface 312 exchanges data with nearby control device 100 using near-field communication. First communication interface 312 uses a known communication system such as Bluetooth (registered trademark) or Bluetooth (registered trademark) Low Energy (BLE) as the near-field communication.

Second communication interface 314 exchanges data with server 200 over the Internet.

<D. Example of Functional Configuration of Information Providing System>

Figure 6:
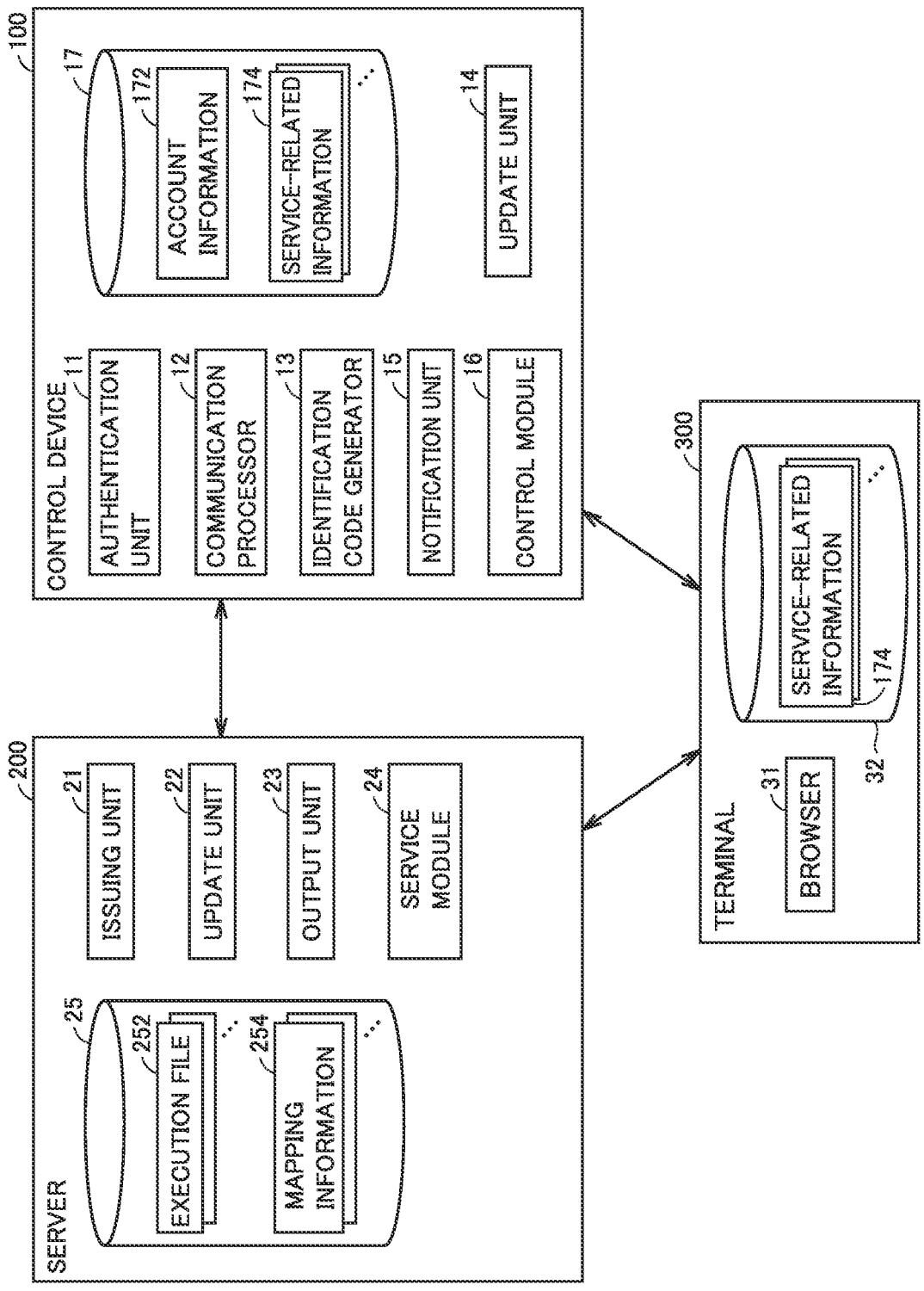
FIG. 6 is a diagram schematically illustrating an example of a functional configuration of the information providing system illustrated in FIG. 1.

FIG. 6 is a diagram schematically illustrating an example of a functional configuration of the information providing system illustrated in FIG. 1. Control device 100 in the example illustrated in FIG. 6 includes an authentication unit 11, a communication processor 12, an identification code generator 13, an update unit 14, a notification unit 15, a control module 16, and a storage unit 17. Authentication unit 11, communication processor 12, identification code generator 13, update unit 14, and notification unit 15 are implemented by system program 130 executed by processor 102 illustrated in FIG. 3. Control module 16 is implemented by control program 132 executed by processor 102 illustrated in FIG. 3. Storage unit 17 is implemented by storage 110 and main memory 104 illustrated in FIG. 3.

Storage unit 17 stores account information 172 (for example, a user ID and a password) on the observer who receives a service associated with control device 100. Account information 172 is created in advance by a support device (not illustrated) and stored in storage unit 17.

Storage unit 17 further stores service-related information 174 for each of at least one service associated with control device 100. Service-related information 174 is updated by update unit 14.

Figure 7:
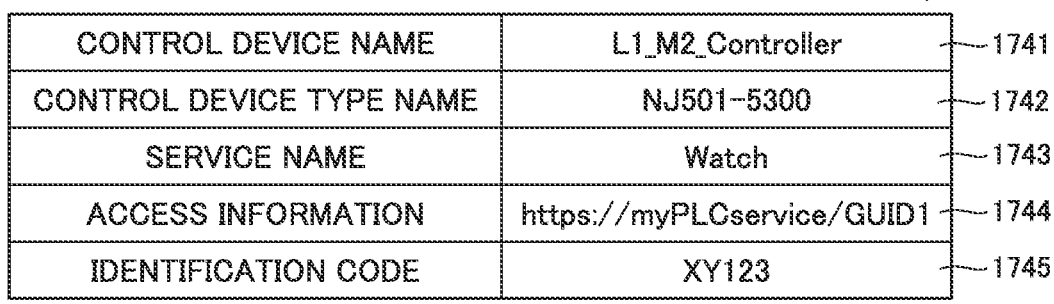
FIG. 7 is a diagram illustrating an example of service-related information stored in the control device.

FIG. 7 is a diagram illustrating an example of the service-related information stored in the control device. Service-related information 174 in the example illustrated in FIG. 7 is associated with a service "Watch" of a control device "L1_M2_Contoroller". As illustrated in FIG. 7, service-related information 174 contains device identification information 1741 for identifying control device 100, type information 1742 showing the type of control device 100, service identification information 1743 for identifying a service, access information 1744 for accessing the service, and an identification code 1745 with all the pieces of information associated with each other. Device identification information 1741 shows, for example, the name of control device 100. Service identification information 1743 shows, for example, the name of a service.

Returning to FIG. 6, authentication unit 11 performs authentication of terminal 300 communicatively connected via radio communication controller 118 (see FIG. 3). Authentication unit 11 compares authentication information (for example, a user ID and a password) received from terminal 300 with account information 172 stored in storage unit 17. Authentication unit 11 determines that the authentication has succeeded when the authentication information and account information 172 coincide with each other, and determines that the authentication has failed when the authentication information and account information 172 do not coincide with each other.

Communication processor 12 controls the start and termination of a communication session with server 200 for receiving the access information. Communication processor 12 starts the communication session with server 200 in response to the establishment of the communication connection between terminal 300 and radio communication controller 118 (see FIG. 3) and the determination result that the authentication performed by authentication unit 11 has succeeded. Upon receipt of the access information from server 200, communication processor 12 terminates the communication session.

Every time a communication session with server 200 for receiving the access information is started, identification code generator 13 generates an identification code for identifying the communication session. Identification code generator 13 outputs the identification code thus generated to server 200 over the communication session.

Update unit 14 updates service-related information 174 (see FIG. 7) stored in storage unit 17. Every time identification code generator 13 generates a new identification code, update unit 14 updates identification code 1745 contained in service-related information 174 to the new identification code.

Update unit 14 receives, from server 200, update information containing service identification information and access information associated with each other.

When no service-related information 174 containing the service identification information indicated by the update information has been stored in storage unit 17, update unit 14 creates new service-related information 174 containing the service identification information and stores service-related information 174 thus created in storage unit 17.

Update unit 14 identifies service-related information 174 containing the service identification information indicated by the update information. Update unit 14 updates access information 1744 contained in service-related information 174 thus identified to the access information indicated by the update information.

Notification unit 15 reads service-related information 174 thus updated from storage unit 17, and notifies service-related information 174 to terminal 300 communicatively connected via radio communication controller 118 (see FIG. 3).

Control module 16 controls the control target (not illustrated) connected over the field network. Control module 16 obtains various variables from the control target and controls the control target in accordance with the variables thus obtained. In response to a request from server 200, control module 16 outputs some or all of the variables obtained from the control target to server 200 as target information.

Terminal 300 in the example illustrated in FIG. 6 includes a browser 31 and a storage unit 32. Browser 31 is implemented by Web browser 3104 executed by processor 302 illustrated in FIG. 5. Storage unit 32 is implemented by storage 310 illustrated in FIG. 5. Storage unit 32 stores service-related information 174 notified from control device 100.

Browser 31 accesses server 200 in accordance with access information 1744 (see FIG. 7) of specified service-related information 174. At this time, browser 31 transmits identification code 1745 contained in specified service-related information 174 to server 200. Browser 31 receives the target information from server 200. Browser 31 causes display 308 (see FIG. 5) to display the target information received from server 200.

Server 200 in the example illustrated in FIG. 6 includes an issuing unit 21, an update unit 22, an output unit 23, a service module 24, and a storage unit 25. Issuing unit 21, update unit 22, output unit 23, and service module 24 are implemented by OS 220 and server program 222 stored in storage 206 and executed by processor 202 illustrated in FIG. 4. Storage unit 25 is implemented by storage 206 and main memory 204 illustrated in FIG. 4.

Storage unit 25 stores an execution file 252 for executing each service in each control device 100. Execution file 252 is created in advance to adapt to the type of corresponding control device 100. For example, when a control program is designed for control device 100, execution file 252 for executing a service associated with control device 100 is created.

Further, storage unit 25 stores, for each service of each control device 100, mapping information 254 for associating access information for accessing the service with execution file 252. Mapping information 254 is updated by update unit 22.

Figure 8:
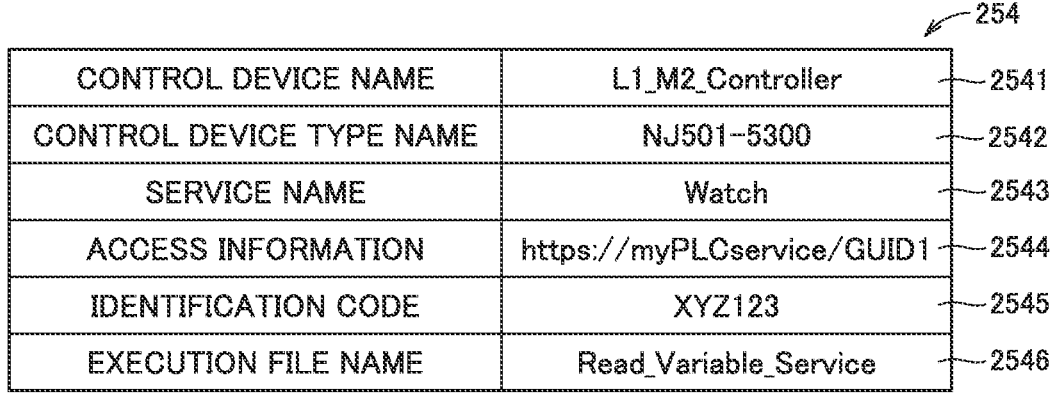
FIG. 8 is a diagram illustrating an example of mapping information stored in the server.

FIG. 8 is a diagram illustrating an example of the mapping information stored in the server. Mapping information 254 in the example illustrated in FIG. 8 is associated with the service "Watch" of the control device "L1_M2_Contoroller". As illustrated in FIG. 8, mapping information 254 contains device identification information 2541 for identifying control device 100, type information 2542 showing the type of control device 100, service identification information 2543 for identifying a service, access information 2544 for accessing the service, an identification code 2545, and a file identification information 2546 for identifying execution file 252 with all the pieces of information associated with each other. Device identification information 2541 shows, for example, the name of control device 100. Service identification information 2543 shows, for example, the name of a service. File identification information 2546 shows, for example, the name of a file.

Issuing unit 21 issues temporary access information for accessing each of at least one service associated with control device 100 in a manner that depends on the communication session with control device 100. Issuing unit 21 issues different access information by communication session.

Update unit 22 updates mapping information 254 (see FIG. 8) stored in storage unit 25. Update unit 22 updates, for a service for which new access information has been issued by issuing unit 21, access information 2544 contained in mapping information 254 to the new access information.

Further, upon receipt of an identification code from control device 100, update unit 22 updates identification code 2545 contained in mapping information 254 associated with control device 100 to the identification code received from control device 100.

Furthermore, update unit 22 deletes access information 2544 contained in mapping information 254 when one of the following conditions (a) and (b) is satisfied, thereby invalidating the access information issued by issuing unit 21.

Condition (a): A predetermined period of time (for example, 1 hour) has elapsed since issuing unit 21 issued the access information; and Condition (b): Service module 24 has already provided the target information to terminal 300.

Output unit 23 outputs the access information issued by issuing unit 21 to control device 100. Specifically, output unit 23 identifies mapping information 254 associated with control device 100 having the established communication session.

Output unit 23 outputs, to control device 100, update information containing service identification information 2543 and access information 2544 associated with each other and contained in mapping information 254 thus identified.

Service module 24 executes a service associated with the access information in response to the access from terminal 300 based on the access information. Specifically, service module 24 identifies mapping information 254 containing access information 2544 that coincides with the access information specified by terminal 300. Service module 24 determines whether identification code 2545 contained in mapping information 254 thus identified coincides with the identification code received from terminal 300.

When identification code 2545 contained in mapping information 254 coincides with the identification code received from terminal 300, service module 24 reads execution file 252 identified based on file identification information 2546 contained in mapping information 254. Service module 24 executes the service in accordance with execution file 252 thus read. Specifically, service module 24 collects target information from corresponding control device 100 and provides the target information thus collected to terminal 300.

On the other hand, when identification code 2545 contained in mapping information 254 does not coincide with the identification code received from terminal 300, service module 24 outputs an error notification to terminal 300.

<E. Flow of Processing of Information Providing System>

Figure 9:
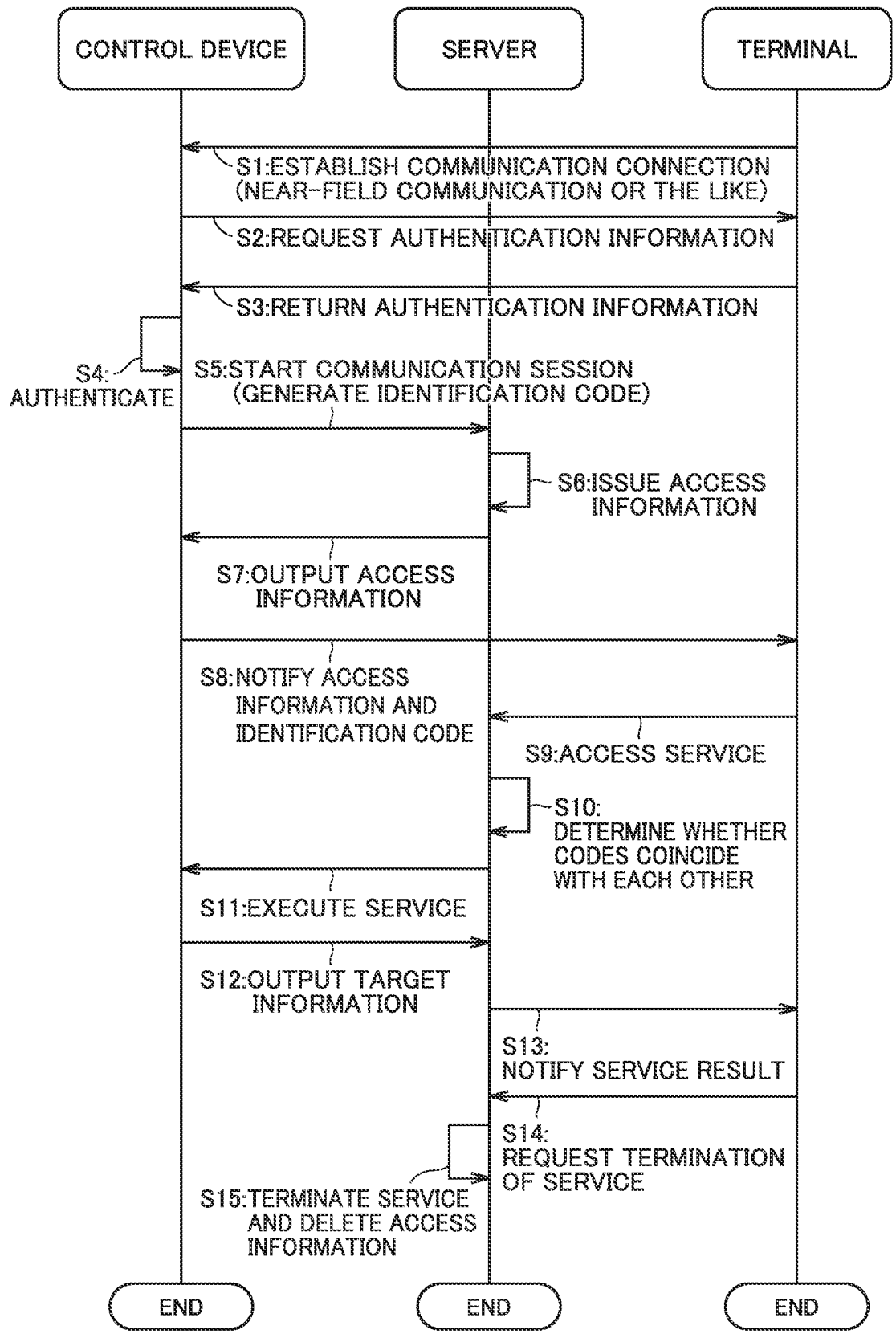
FIG. 9 is a timing chart illustrating an overall flow of information providing processing in the information providing system.

FIG. 9 is a timing chart illustrating an overall flow of information providing processing in the information providing system.

First, the observer moves, with terminal 300 in his/her hand, to the vicinity of desired control device 100. This causes terminal 300 and control device 100 to be communicatively connected using near-field communication (step S1). Control device 100 requests terminal 300 to provide authentication information (for example, a user ID and a password) (step S2). Terminal 300 returns the authentication information to control device 100 in response to the input made by the observer (step S3). Control device 100 performs authentication of the observer by comparing the authentication information received from terminal 300 with account information stored in advance (step S4).

Control device 100 starts a communication session with server 200 in response to the establishment of a communication connection with terminal 300 and success of authentication of terminal 300 (step S5). At this time, control device 100 generates an identification code for identifying the communication session, and outputs the identification code thus generated to server 200.

Server 200 issues access information for accessing each of at least one service associated with control device 100 in a manner that depends on the communication session with control device 100 (step S6). Server 200 outputs the access information to control device 100 (step S7).

Control device 100 notifies, to terminal 300, the identification code generated in step S5 and the access information received from server 200 in step S7 (step S8).

Terminal 300 accesses the service of server 200 in accordance with the access information specified by the operation made by the observer (step S9). At this time, terminal 300 transmits, to server 200, the identification code notified in step S8.

Server 200 determines whether the identification code received from control device 100 in step S5 coincides with the identification code received from terminal 300 in step S9 (step S10).

In response to a determination result that the identification code received in step S5 coincides with the identification code received in step S9, server 200 executes the service associated with the specified access information (step S11). Specifically, server 200 requests control device 100 associated with the service to provide target information. Control device 100 outputs the target information to server 200 (step S12).

Server 200 provides terminal 300 with the target information (service result) collected from control device 100 (step S13). Terminal 300 outputs a service termination request to server 200 in response to the operation made by the observer (step S14).

Server 200 terminates the execution of the service in accordance with the service termination request (step S15). At this time, server 200 deletes the access information for accessing the service being terminated. This invalidate the access information to disable the access to the service based on the access information.

<F. Flow of Preprocessing for Receiving Service>

Figure 10:
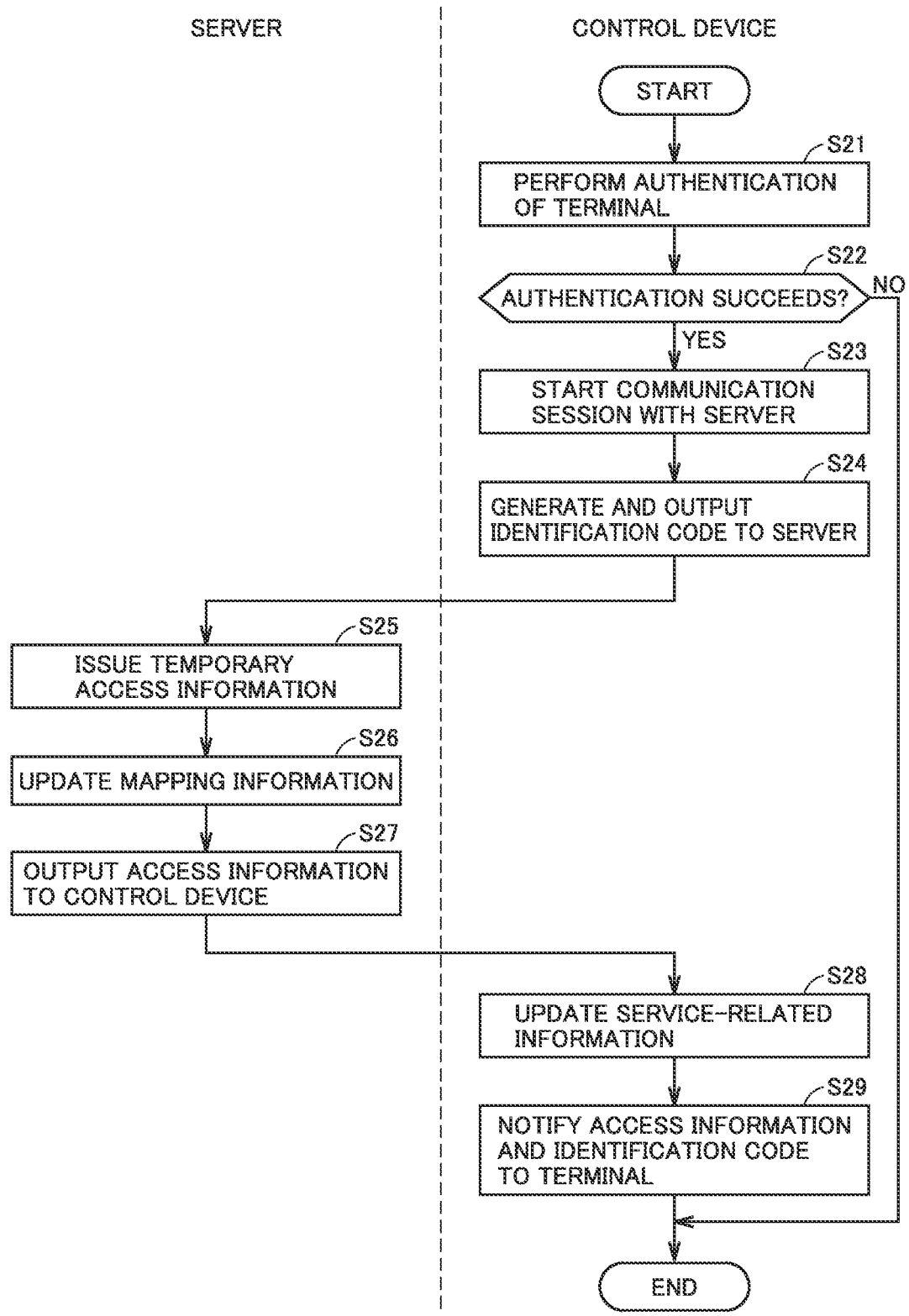
FIG. 10 is a flowchart illustrating an example of a flow of preprocessing for service provision.

FIG. 10 is a flowchart illustrating an example of a flow of preprocessing for service provision. Processor 102 of control device 100 performs authentication of terminal 300 communicatively connected (step S21). Specifically, processor 102 performs authentication of terminal 300 by comparing authentication information received from terminal 300 with account information 172 stored in advance. When the authentication fails (NO in step S22), the preprocessing is terminated.

When the authentication succeeds (YES in step S22), processor 102 starts a communication session with server 200 (step S23). Processor 102 generates an identification code for identifying the communication session, and outputs the identification code thus generated to server 200 (step S24).

Processor 202 of server 200 issues temporary access information for accessing each of at least one service associated with control device 100 in a manner that depends on the communication session with control device 100 (step S25). Processor 202 updates mapping information 254 (step S26). Specifically, processor 202 updates identification code 2545 contained in mapping information 254 associated with control device 100 based on the identification code received from control device 100 in step S24. Further, processor 202 updates access information 2544 contained in mapping information 254 associated with control device 100 to the access information issued in step S25.

Processor 202 outputs the access information issued in step S25 to control device 100 having the established communication session (step S27).

Processor 102 of control device 100 updates service-related information 174 based on the access information output in step S27 (step S28). Specifically, processor 102 updates access information 1744 contained in service-related information 174 to the access information received from server 200. Further, processor 102 updates identification code 1745 contained in service-related information 174 to the identification code generated in step S24.

Processor 102 notifies, to terminal 300, service-related information 174 (containing identification code 1745 and access information 1744) thus updated (step S29). As a result, processor 302 of terminal 300 displays access information 1744 thus notified on display 308.

Figure 11:
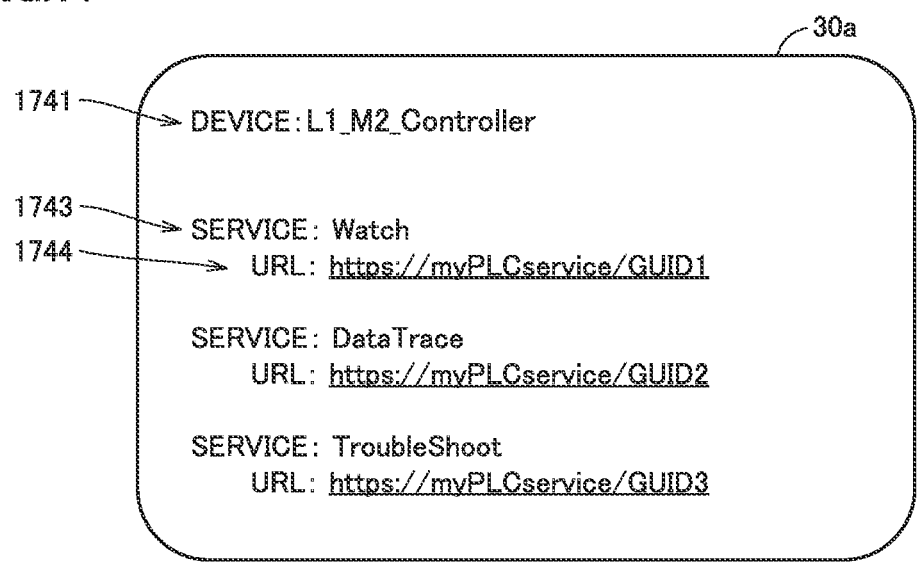
FIG. 11 is a diagram illustrating an example of a screen including access information.

FIG. 11 is a diagram illustrating an example of a screen including access information. A screen 30a in the example illustrated in FIG. 11 is displayed on display 308 of terminal 300. Screen 30a shows device identification information 1741 contained in service-related information 174 notified from control device 100, service identification information 1743 contained in service-related information 174, and access information 1744 contained in service-related information 174. The observer carrying terminal 300 can check screen 30a to specify access information 1744 associated with a desired service from the at least one service associated with control device 100.

Access information 1744 contained in service-related information 174 and notified from control device 100 to terminal 300 is the same as the access information temporarily issued by server 200 in step S25. This enables terminal 300 to access the service of server 200 based on access information 1744.

<G. Flow of Service Providing Processing>

Figure 12:
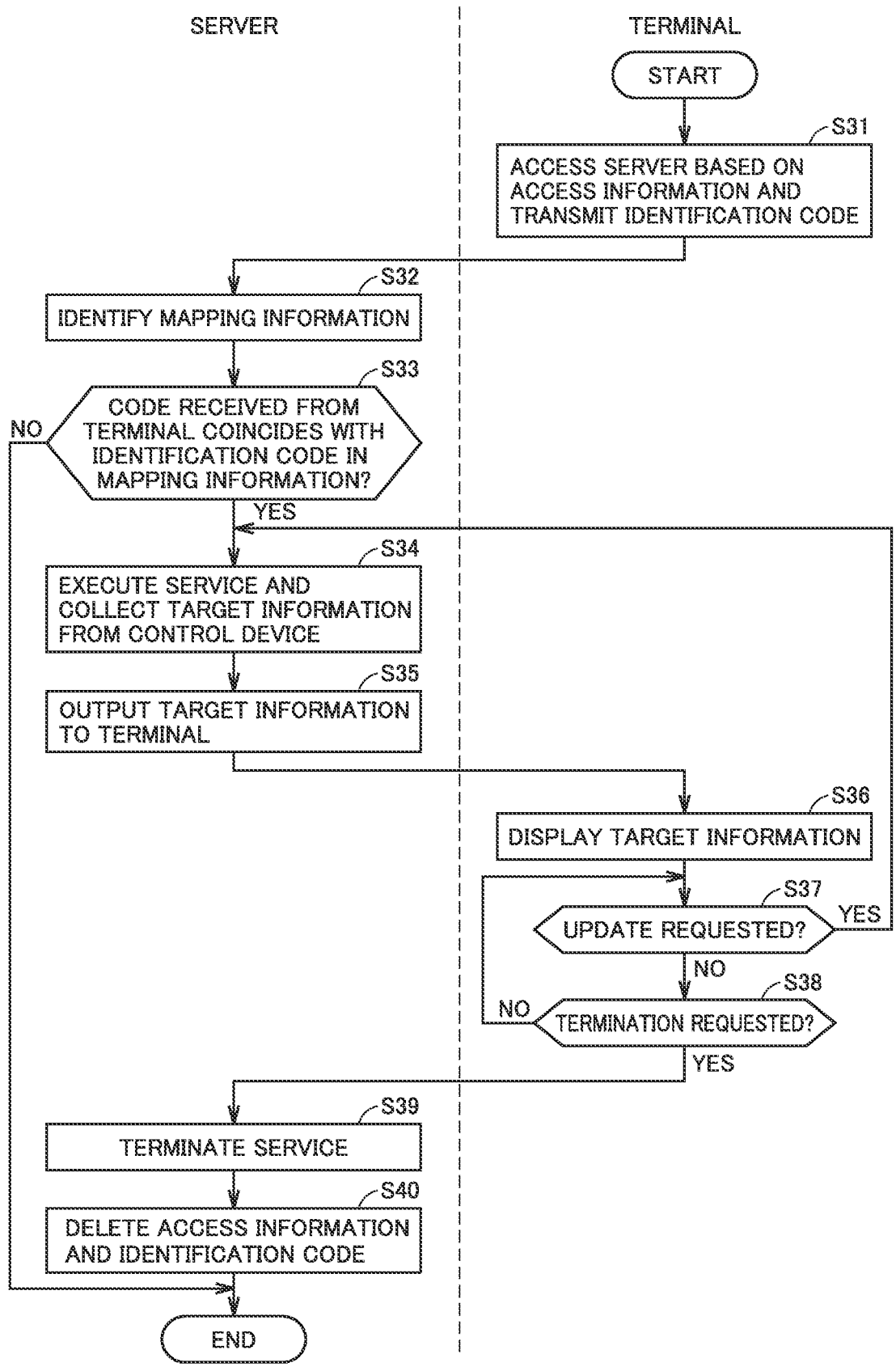
FIG. 12 is a flowchart illustrating an example of a flow of service providing processing.

FIG. 12 is a flowchart illustrating an example of a flow of service providing processing. Processor 302 of terminal 300 accesses server 200 based on the access information specified by the observer, and transmits the identification code associated with the access information to server 200 (step S31).

Processor 202 of server 200 identifies mapping information 254 containing the access information in response to the access based on the access information (step S32). Processor 202 determines whether the identification code received from terminal 300 coincides with identification code 2545 contained in mapping information 254 thus identified (step S33).

When the identification code received from the terminal does not coincide with identification code 2545 contained in mapping information 254 (NO in step S33), the service providing processing is terminated. A third party who has obtained the access information in an unauthorized manner by, for example, stealing a glance at screen 30a illustrated in FIG. 11 without properly receiving the access information through the preprocessing illustrated in FIG. 10 does not recognize the identification code. Therefore, even when the third party inputs the access information to terminal 400 to access server 200, the determination in step S33 results in NO. This makes it possible to further reduce the threat to leakage of target information to a third party.

When the identification code received from the terminal coincides with identification code 2545 contained in mapping information 254 (YES in step S33), processor 202 executes a service associated with the access information and collects target information from control device 100 (step S34). Specifically, processor 202 collects the target information from corresponding control device 100 by reading execution file 252 indicated by file identification information 2546 contained in mapping information 254 identified in step S32. Processor 202 outputs the target information thus collected to terminal 300 (step S35).

Processor 302 of terminal 300 causes display 308 to display the target information received from server 200 (step S36).

Figure 13:
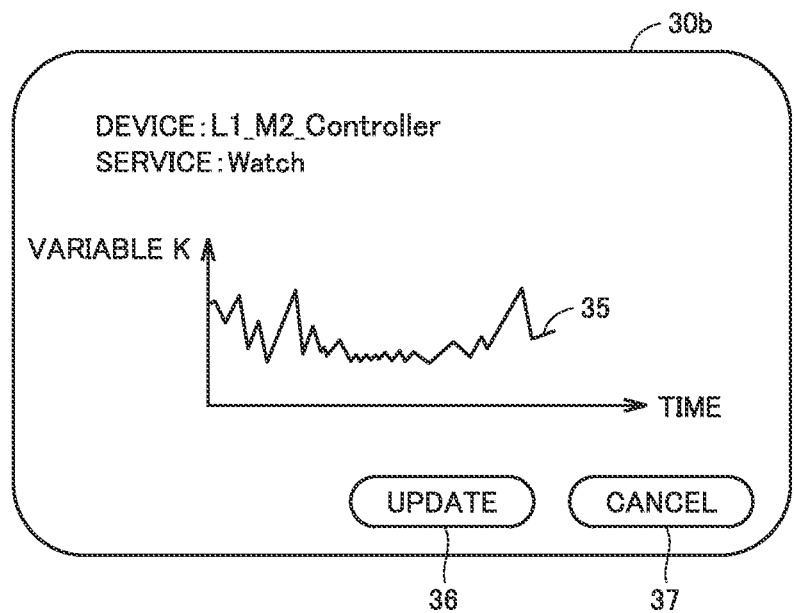
FIG. 13 is a diagram illustrating an example of a screen displayed on the terminal in step S36 of FIG. 12.

FIG. 13 is a diagram illustrating an example of the screen displayed on the terminal in step S36 of FIG. 12. FIG. 13 illustrates a screen 30b corresponding the service "Watch" for checking target information "variable K" collected from the control device "L1_M$_2$_Contoroller". Screen 30b includes a graph 35 showing changes in variable K over time, update button 36, and cancel button 37.

Returning to FIG. 12, processor 302 determines whether an update request has been input (step S37). When update button 36 illustrated in FIG. 13 is clicked, processor 302 determines that the update request has been input. When the update request has been input (YES in step S37), the service providing processing returns to step S34. This causes steps S34 to S36 to repeat to update graph 35 based on the latest target information.

When no update request has been input (NO in step S37), processor 302 determines whether the termination request has been input (step S38). When cancel button 37 illustrated in FIG. 13 is clicked, processor 302 determines that the termination request has been input. When no termination request has been input (NO in step S38), the service providing processing returns to step S37.

When the termination request has been input (YES in step S38), processor 202 of server 200 terminates the service (step S39). Next, processor 202 deletes access information 2544 and identification code 2545 contained in mapping information 254 associated with the service thus terminated (step S40). This prevents, even when access information 2544 is obtained in an unauthorized manner, the access to server 200 based on access information 2544 after step S40.

Note that, although not illustrated in FIGS. 10 and 12, processor 202 of server 200 deletes access information 2544 from mapping information 254 upon the lapse of the predetermined period of time from the issuance the access information, thereby invalidating access information 2544. This prevents, even when access information 2544 has leaked out to a third party, the third party from receiving a service using access information 2544 after the lapse of the predetermined period of time.

<H. Modification>

In the above description, control device 100 generates an identification code for identifying a communication session with server 200. Alternatively, server 200 may generate the identification code.

Figure 14:
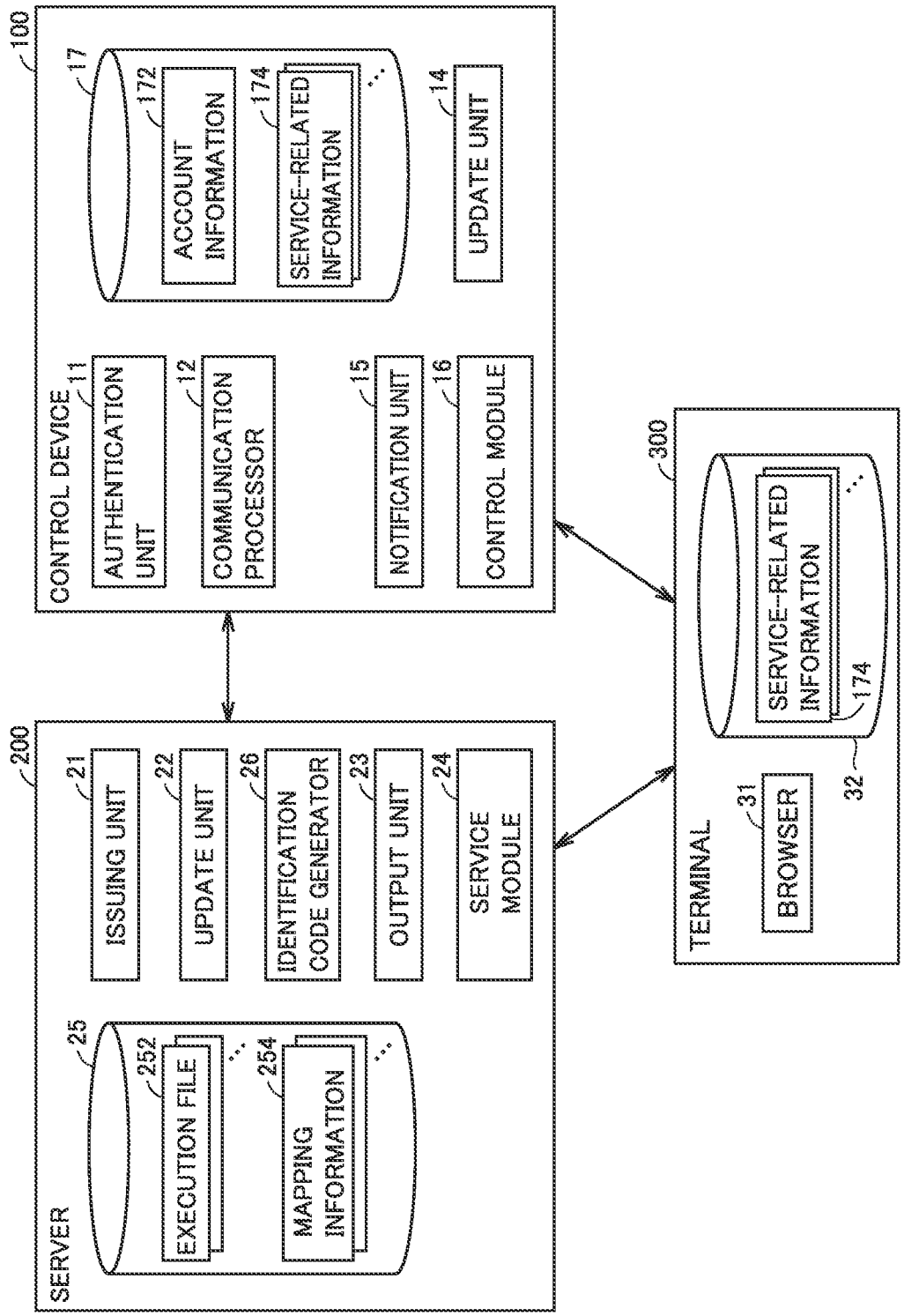
FIG. 14 is a diagram schematically illustrating an example of a functional configuration of an information providing system according to a modification.

FIG. 14 is a diagram schematically illustrating an example of a functional configuration of an information providing system according to a modification. The information providing system illustrated in FIG. 14 is different from information providing system SYS illustrated in FIG. 6 in that control device 100 does not include identification code generator 13, and server 200 includes an identification code generator 26.

Upon the establishment of a communication session with control device 100, identification code generator 26 generates an identification code for identifying the communication session. Identification code generator 26 outputs the identification code thus generated to control device 100 having the established communication session.

Update unit 22 of server 200 may update identification code 2545 contained in mapping information 254 associated with control device 100 having the established communication session to the identification code generated by identification code generator 26.

Further, update unit 14 of control device 100 may update identification code 1745 contained in service-related information 174 stored in storage unit 17 to the identification code received from server 200.

In the above description, terminal 300 and control device 100 are communicatively connected using near-field communication. Alternatively, terminal 300 and control device 100 may be communicatively connected using another communication system.

For example, with a two-dimensional barcode indicating the URL of control device 100 attached to a main body of control device 100, a barcode reader built in terminal 300 may read the two-dimensional barcode. Terminal 300 may be communicatively connected to control device 100 over the Internet according to the URL indicated by the two-dimensional barcode thus read. In this case, in order to communicatively connect terminal 300 and control device 100 and receive, from control device 100, access information for terminal 300 to access a service, the observer needs to go to the installation location of control device 100. This makes it possible to reduce the threat to leakage of access information to an unintended third party.

<I. Actions and Effects>

As described above, the information providing method applied to the information providing system including control device 100 that controls a control target, server 200 that provides a service associated with control device 100, and terminal 300 includes the following first to fourth steps: First step: control device 100 starts a communication session with server 200 in response to the establishment of a communication connection with terminal 300; Second step: server 200 issues temporary access information for accessing a service in a manner that depends on the communication session, The access information is different for each communication session; Third step: control device 100 notifies the access information to terminal 300; and Fourth step: server 200 provides target information collected from control device 100 to terminal 300 in response to the access from terminal 300 based on the access information.

According to the above-described configuration, the temporary access information is issued upon the establishment of the communication connection between terminal 300 and control device 100. Terminal 300 can obtain the target information from server 200 by accessing server 200 based on the access information received from control device 100.

The access information is not notified to a terminal that has no communication connection with control device 100. This makes an unintended third party unable to recognize the access information and make unauthorized access to server 200 using another terminal 400. This can reduce the threat to security.

Further, access information is temporarily issued. Therefore, even when the access information is successfully obtained from terminal 300 in an unauthorized manner, there is a possibility that the access information is already invalid. This can further reduce the threat to security.

The access information is, for example, a one-time URL. This allows terminal 300 to access, using a general-purpose Web browser, a service according to the one-time URL.

Terminal 300 and control device 100 are communicatively connected using, for example, near-field communication. Control device 100 is typically installed in a factory. Generally speaking, any third party other than parties concerned (including an observer) is not allowed to enter the factory. The access information for accessing a service is issued upon the establishment of the communication connection between terminal 300 and control device 100. This can prevent the access information from being issued to a third party who is not allowed to enter a facility where control device 100 is installed. This can further reduce the threat to security.

The information providing method further includes a step of generating, by one of control device 100 and server 200, an identification code for identifying the communication session between control device 100 and server 200 and outputting the identification code to the other of control device 100 and server 200. The above-described third step (notification step) includes a step of notifying, by control device 100, the identification code to terminal 300 together with access information. The information providing method further includes a step of determining, by server 200, whether a code received from terminal 300 that has made access based on the access information coincides with the identification code. The above-described fourth step (providing step) is performed in response to a determination result that the code received from terminal 300 and the identification code coincide with each other.

This prevents, even when a third party who has obtained the access information in an unauthorized manner inputs the access information to terminal 400, the third party from receiving a service because the third party does not recognize the identification code. This can further reduce the threat to security.

The information providing method further includes a step of invalidating, by server 200, the access information upon the lapse of the predetermined period of time from the issuance of the access information. This prevents, even when the access information has leaked out to a third party, the third party from receiving a service using the access information after the lapse of the predetermined period of time. This can further reduce the threat to security.

The information providing method further includes a step of invalidating, by server 200, the access information after the above-described fourth step (providing step). This prevents, even when the access information has leaked out to a third party, the third party from receiving a service using the access information after the termination of the provision of the service to an authorized observer. This can further reduce the threat to security.

The information providing method further includes performing, by control device 100, authentication of terminal 300. The above-described first step (step of starting a communication session) is performed in response to success of the authentication. This makes it possible to prevent the access information from leaking out to a third party other than the authorized observer.

<J. Appendix>

As described above, the present embodiment and modifications include the following disclosure.

(Configuration 1)

An information providing method applied to an information providing system (SYS) including a control device (100, 100A, 100B) configured to control a control target, a server (200) configured to provide a service associated with the control device (100, 100A, 100B), and a terminal (300), the information providing method including:

starting, by the control device (100, 100A, 100B), a communication session with the server (200) in response to establishment of a communication connection with the terminal (300);

issuing, by the server (200), temporary access information for accessing the service in a manner that depends on the communication session, the access information being different for each communication session;

notifying, by the control device (100, 100A, 100B), the access information to the terminal (300); and providing, by the server (200), target information collected from the control device (100, 100A, 100B) to the terminal (300) in response to access from the terminal (300) based on the access information.

(Configuration 2)

In the information providing method according to configuration 1, the access information is a one-time URL.

(Configuration 3)

In the information providing method according to configuration 1 or 2, the terminal (300) and the control device (100, 100A, 100B) are communicatively connected using near-field communication.

(Configuration 4)

The information providing method according to any one of configurations 1 to 3, further includes:

generating, by one of the control device (100, 100A, 100B) and the server (200), an identification code for identifying the communication session and outputting the identification code to the other of the control device (100, 100A, 100B) and the server (200); and determining, by the server (200), whether a code received from the terminal (300) that has made access based on the access information coincides with the identification code.

The notifying includes notifying, by the control device (100, 100A, 100B), the identification code to the terminal (300) together with the access information.

The providing is performed in response to a determination result that the code received from the terminal (300) and the identification code coincide with each other.

(Configuration 5)

The information providing method according to any one of configurations 1 to 4, further includes invalidating, by the server (200), the access information upon lapse of a predetermined period of time from the issuance of the access information.

(Configuration 6)

The information providing method according to any one of configurations 1 to 5, further includes invalidating, by the server (200), the access information after the providing.

(Configuration 7)

The information providing method according to any one of configurations 1 to 6, further includes performing, by the control device (100, 100A, 100B), authentication of the terminal (300), and the starting a communication session is performed in response to success of the authentication.

(Configuration 8)

An information providing system (SYS) includes:

a control device (100, 100A, 100B) configured to control a control target;

a server (200) configured to provide a service associated with the control device (100, 100A, 100B); and a terminal (300).

The control device (100, 100A, 100B) includes a communication processor (12) configured to start a communication session with the server (200) in response to establishment of a communication connection with the terminal (300).

The server (200) includes an issuing unit (21) configured to issue temporary access information for accessing the service in a manner that depends on the communication session, and an output unit (23) configured to output the access information to the control device (100, 100A, 100B), the access information being different for each communication session.

The control device (100, 100A, 100B) further includes a notification unit (15) configured to notify the access information to the terminal (300).

The server (200) further includes a service module (24) configured to provide target information collected from the control device (100, 100A, 100B) to the terminal in response to access from the terminal based on the access information.

(Configuration 9)

A server (200) provided in an information providing system (SYS) according to configuration 8, includes the issuing unit (21), the output unit (23), and the service module (24).

Although the embodiments of the present invention have been described, it should be understood that the embodiments disclosed herein are illustrative in all respects and not restrictive. The scope of the present invention is set forth by the claims, and the present invention is intended to include the claims, equivalents of the claims, and all modifications within the scope.

REFERENCE SIGNS LIST

11: authentication unit, 12: communication processor, 13, 26: identification code generator, 14, 22: update unit, 15: notification unit, 16: control module, 17, 25, 32: storage unit, 21: issuing unit, 23: output unit, 24: service module, 30a, 30b: screen, 31: browser, 35: graph, 36: update button, 37: cancel button, 100, 100A, 100B: control device, 102, 202, 302: processor, 104, 204, 304: main memory, 106: host network controller, 108: field network controller, 110, 206, 310: storage, 112: memory card interface, 114: memory card, 116: local bus controller, 118: radio communication controller, 120: USB controller, 122, 318: processor bus, 130: system program, 132: control program, 172: account information, 174: service-related information, 200: server, 208, 308: display, 210, 306: input unit, 212: network controller, 214: internal bus, 222: server program, 250, 1744, 2544: access information, 252: execution file, 254: mapping information, 300, 400: terminal, 312: first communication interface, 314: second communication interface, 1741, 2541: device identification information, 1742, 2542: type information, 1743, 2543: service identification information, 1745, 2545: identification code, 2546: file identification information, 3102: OS, 3104: Web browser, SYS: information providing system

The invention claimed is:

1. An information providing method applied to an information providing system including a control device configured to control a control target, a server configured to provide a service associated with the control device, and a terminal, the information providing method comprising:

starting, by the control device, a communication session with the server in response to establishment of a communication connection with the terminal;

issuing, by the server, temporary access information for accessing the service in a manner that depends on the communication session, the access information being different for each communication session;

notifying, by the control device, the access information to the terminal; and providing, by the server, target information collected from the control device to the terminal in response to access from the terminal based on the access information.

2. The information providing method according to claim 1, wherein the access information is a one-time URL.

3. The information providing method according to claim 1, wherein the terminal and the control device are communicatively connected using near-field communication.

4. The information providing method according to claim 1, further comprising:

generating, by one of the control device and the server, an identification code for identifying the communication session and outputting the identification code to the other of the control device and the server; and determining, by the server, whether a code received from the terminal that has made access based on the access information coincides with the identification code, wherein the notifying includes notifying, by the control device, the identification code to the terminal together with the access information, and the providing is performed in response to a determination result that the code received from the terminal and the identification code coincide with each other.

5. The information providing method according to claim 1, further comprising invalidating, by the server, the access information upon lapse of a predetermined period of time from the issuance of the access information.

6. The information providing method according to claim 1, further comprising invalidating, by the server, the access information after the providing.

7. The information providing method according to claim 1, further comprising performing, by the control device, authentication of the terminal, wherein the starting a communication session is performed in response to success of the authentication.

8. An information providing system comprising:
a control device configured to control a control target;
a server configured to provide a service associated with the control device; and
a terminal, wherein the control device includes a communication processor configured to start a communication session with the server in response to establishment of a communication connection with the terminal, the server includes:
an issuing unit configured to issue temporary access information for accessing the service in a manner that depends on the communication session; and
an output unit configured to output the access information to the control device, the access information being different for each communication session, the control device further includes a notification unit configured to notify the access information to the terminal, and the server further includes a service module configured to provide target information collected from the control device to the terminal in response to access from the terminal based on the access information.

9. A server provided in an information providing system according to claim 8, comprising:
the issuing unit;
the output unit; and
the service module.

\* \* \* \* \*